(12) United States Patent
Kozakai et al.

(10) Patent No.: US 6,668,122 B2
(45) Date of Patent: Dec. 23, 2003

(54) COATED OPTICAL FIBER

(75) Inventors: Shouhei Kozakai, Annaka (JP);
Masatoshi Asano, Annaka (JP);
Shigeru Konishi, Annaka (JP); Toshio Ohba, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 94 days.

(21) Appl. No.: 10/073,158

(22) Filed: Feb. 13, 2002

(65) Prior Publication Data
US 2002/0159737 A1 Oct. 31, 2002

(30) Foreign Application Priority Data

Feb. 13, 2001 (JP) .......................... 2001-035456

(51) Int. Cl.$^7$ ................................. G02B 6/02
(52) U.S. Cl. ........................ 385/128; 438/378
(58) Field of Search ................. 385/123–124, 385/126–128; 438/378

(56) References Cited

U.S. PATENT DOCUMENTS

| | | |
|---|---|---|
| 4,472,019 A | 9/1984 | Bishop et al. |
| 5,461,691 A | 10/1995 | Schunck et al. |
| 5,696,179 A * | 12/1997 | Chawla ..................... 522/90 |
| 6,023,547 A | 2/2000 | Tortorello |
| 6,057,034 A * | 5/2000 | Yamazaki et al. .......... 428/378 |
| 6,075,065 A * | 6/2000 | Yamazaki et al. ............ 522/64 |
| 6,246,824 B1 | 6/2001 | Vandeberg et al. |
| 2001/0031319 A1 | 10/2001 | Ohba et al. |
| 2002/0076555 A1 * | 6/2002 | Kozakai et al. ............ 428/375 |

FOREIGN PATENT DOCUMENTS

| | | |
|---|---|---|
| EP | 1 046 619 A2 | 10/2000 |
| EP | 1 134 201 A1 | 9/2001 |
| JP | 59-170155 A | 9/1984 |
| WO | WO98/041484 A1 | 9/1998 |

* cited by examiner

*Primary Examiner*—Akm Enayet Ullah
*Assistant Examiner*—Michelle R. Connelly-Cushwa
(74) *Attorney, Agent, or Firm*—Birch, Stewart, Kolasch & Birch, LLP

(57) ABSTRACT

In a coated optical fiber comprising a quartz glass fiber, a primary coating and a secondary coating, the secondary coating is formed by curing a resin composition comprising (A) 20–90 wt % of a polyurethane (meth)acrylate oligomer which is synthesized from an alicyclic polyisocyanate, contains 5–90 wt % of a polyurethane (meth)acrylate oligomer having a Mn of up to 1,000, and has an overall Mn of up to 10,000, and (B) 80–10 wt % of an ethylenically unsaturated compound, with electron beams accelerated at 50–125 kV. The coated optical fiber has a minimized transmission loss.

5 Claims, 2 Drawing Sheets

→ EXAMPLE 1
→ COMPARATIVE EXAMPLE 1
→ EXAMPLE 2
→ COMPARATIVE EXAMPLE 2

# COATED OPTICAL FIBER

This invention relates to a coated optical fiber for optical communications coated with a secondary coating material which is fast curable with electron beams and has well-balanced properties.

BACKGROUND OF THE INVENTION

Current optical communications fibers include a variety of types such as quartz glass, multi-component glass and plastic fibers. Among these, quartz glass fibers are vastly used in a wide variety of applications because of their light weight, heat resistance, noninductive nature, low loss and high transmission capacity.

Albeit the above advantages, quartz glass fibers for optical communications are very thin, brittle and prone to breakage by external factors, so that the transmission loss is increased under external stresses. Thus the quartz glass fibers are generally provided with a two-layer resin cover by previously applying a relatively soft primary or buffer coating material and then applying a secondary or top coating material around the primary coating layer for protection.

Since the secondary coating layer serves to protect the soft primary coating layer from external forces and eventually improve the strength of optical fiber, the secondary coating material is required to have a high Young's modulus after curing, maintain the high Young's modulus at elevated temperature, and possess such properties as high elongation, high strength, low water pickup and hydrolytic resistance. The secondary coating material is further required to be fast curable and low viscous in order to comply with the increased drawing speed of optical fiber for increased productivity.

One exemplary secondary coating material is, as disclosed in JP-A 59-170155, a resin composition comprising a polymerizable monomer compound based on a urethane oligomer terminated with ethylenically unsaturated groups at both ends and a photopolymerization initiator. In the process of preparing a coated optical fiber using such a curable composition for secondary coating, a quartz glass fiber as spun is passed through a coating die where it is coated with a primary coating composition, after which the primary coating is cured upon exposure to radiation from an irradiation equipment having a UV lamp built therein. Similarly, a secondary coating resin as formulated above is applied to the primary coating and exposed to UV radiation from a suitable irradiation equipment for curing, completing the secondary coating.

The secondary coating materials are most often radiation, typically UV, curable compositions. These compositions and secondary coatings thereof formed by a curing system satisfy most of the desired properties of the cured coating, but encounter a certain limit in pursuit of the fast cure needed to comply with a high drawing speed.

More particularly, for improving the curing performance of the secondary coating composition through the curing system, it is essential to develop an effective photopolymerization initiator and a high intensity UV lamp, which is difficult. Among radiation curing techniques of the same category, the electron beam curing technique involving the polymerization of ethylenically unsaturated groups provides for fast curing because it does not need a photopolymerization initiator and permits the equipment to be designed over a wide dose range from low to high doses. However, electron beams accelerated at high voltage can penetrate through the coating material and reach the quartz glass core of the optical fiber (serving as an optical waveguide) to damage the core, resulting in an increased transmission loss.

SUMMARY OF THE INVENTION

An object of the invention is to provide a coated optical fiber coated with a secondary coating composition which is curable with electron beams to accomplish a fast cure rate and which in the cured state satisfies the above-mentioned requirements of secondary coating, so that the transmission loss of the fiber is minimized.

It has been found that when a resin composition comprising (A) a specific polyurethane (meth)acrylate oligomer and (B) an ethylenically unsaturated compound is applied to a primarily coated optical fiber and cured with electron beams accelerated at a low voltage of 50 to 125 kV, a coated optical fiber characterized by a reduced transmission loss is produced at a high productivity or at a speed corresponding to high speed drawing.

The present invention provides a coated optical fiber comprising a quartz glass fiber, a primary coating thereon and a secondary coating on the primary coating, the secondary coating being a cured product of a resin composition comprising (A) 20 to 90% by weight of a polyurethane (meth) acrylate oligomer which is synthesized using an alicyclic polyisocyanate as an essential starting reactant, contains 5 to 90% by weight of a polyurethane (meth)acrylate oligomer having a number average molecular weight of up to 1,000, and has an overall number average molecular weight of up to 10,000, and (B) 80 to 10% by weight of an ethylenically unsaturated compound, the resin composition being cured with electron beams accelerated at a voltage of 50 to 125 kV.

DESCRIPTION OF THE PREFERRED EMBODIMENT

Figure 1:
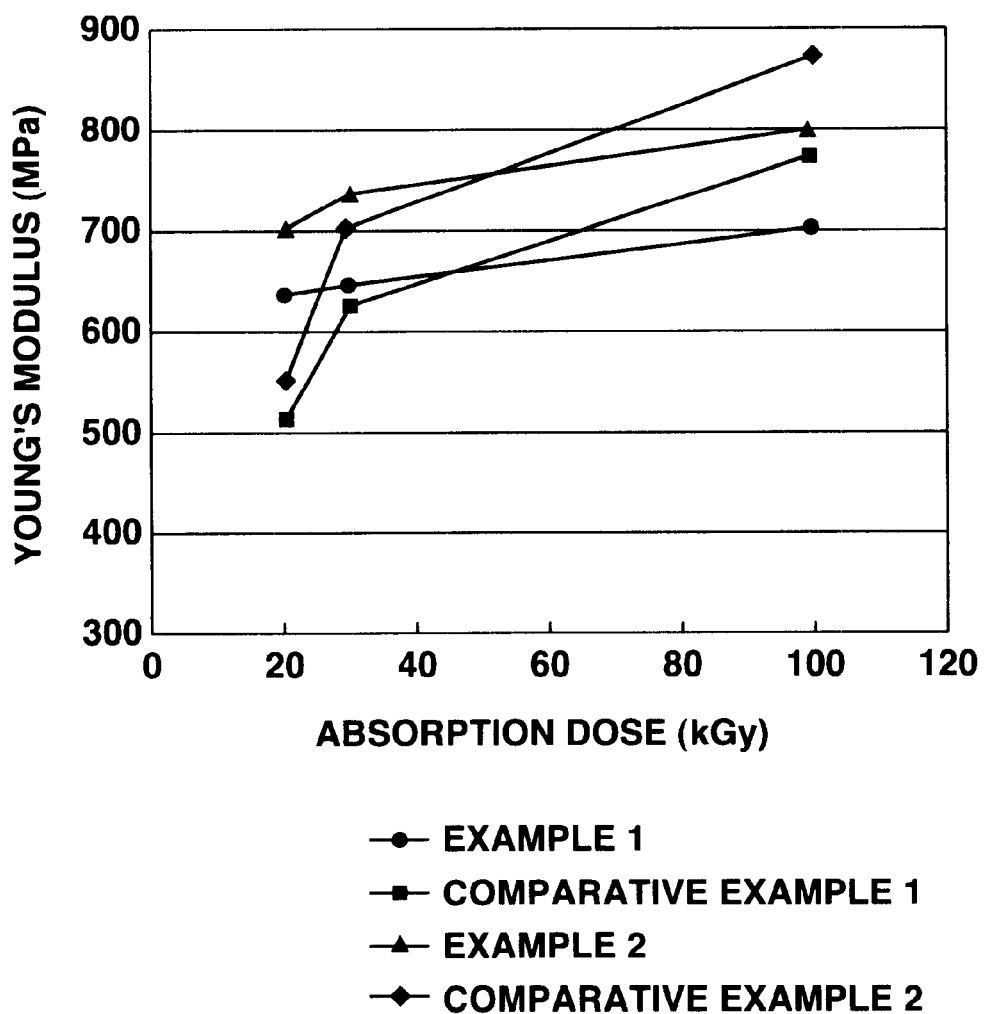
FIG. 1 is a graph of Young's modulus versus absorption dose during EB curing of resin compositions of Examples and Comparative Examples.

The coated optical fiber of the invention includes a primary layer of primary coating material enclosing a quartz glass fiber, and a secondary layer of secondary coating material enclosing the primary layer.

The coating composition used to form the primary layer may be any well-known primary coating composition, which may be of any well-known curing type such as ultraviolet (UV) or electron beam (EB) curing type.

According to the invention, the secondary layer is formed around the primary coating from a resin composition comprising (A) a polyurethane (meth)acrylate oligomer which is synthesized using an alicyclic polyisocyanate as an essential starting reactant, contains 5 to 90% by weight of a polyurethane (meth)acrylate oligomer having a number average molecular weight of up to 1,000, and has an overall number average molecular weight of up to 10,000 and (B) an ethylenically unsaturated compound. This resin composition is described below in detail.

(A) Polyurethane (meth)acrylate Oligomer Synthesized from Alicyclic Polyisocyanate The polyurethane (meth)acrylate oligomer serving as component (A) of the inventive resin composition can be prepared by urethane-forming reaction using (a) a polyol, (b) an alicyclic polyisocyanate and (c) a (meth)acrylate compound having a hydroxyl group. The polyurethane (meth)acrylate oligomer should have an overall number average molecular weight (Mn) of up to 10,000, preferably from about 200 to 10,000, and more preferably from about 300 to 5,000.

(a) Polyol

Suitable polyol components include polyether polyols, polyester polyols, polycarbonate polyols and alkyl diols.

Polyether Polyol

Suitable polyether polyols include homopolymers or copolymers of alkylene oxides, typically $C_2$–$C_5$ alkylene oxides such as ethylene oxide, propylene oxide, butylene oxide, tetrahydrofuran and 3-methyltetrahydrofuran; homopolymers or copolymers of the foregoing alkylene oxides using aliphatic $C_{12}$–$C_{40}$ polyols such as 1,2-hydroxystearyl alcohol and hydrogenated dimer diols as the initiator; adducts of bisphenol A with alkylene oxides such as propylene oxide, butylene oxide and tetrahydrofuran; and adducts of hydrogenated bisphenol A with alkylene oxides such as propylene oxide, butylene oxide and tetrahydrofuran. These polyether polyols may be used alone or in admixture of any.

The preferred polyether polyols are homopolymers or copolymers of $C_2$–$C_4$ alkylene oxides, especially $C_3$–$C_4$ alkylene oxides such as propylene oxide and tetrahydrofuran, for example, polyoxypropylene glycol, polytetramethylene ether glycol and propylene oxide-tetrahydrofuran copolymers. In order to reduce the viscosity of resin or suppress the evolution of hydrogen gas upon curing so as to comply with a high speed of tape manufacture, it is preferred to combine the foregoing with polyether polyols having an oxypropylene structure or polypropylene glycol. The polyether polyols may have a Mn selected, for example, in the range of about 200 to about 10,000.

The polyether polyols are commercially available. For example, (1) polyethylene glycol is available under the trade name of PEG600, PEG1000 and PEG2000 from Sanyo Chemical Industries, Ltd.; (2) polyoxypropylene glycol is available under the trade name of Takelac P-21, Takelac P-22 and Takelac P-23 from Takeda Chemical Industries, Ltd.; (3) polytetramethylene ether glycol is available under the trade name of PTG650, PTG850, PTG1000, PTG2000, and PTG4000 from Hodogaya Chemical Co., Ltd.; (4) propylene oxide-ethylene oxide copolymers are available under the trade name of ED-28 from Mitsui Toatsu Chemicals, Inc. and Excenol 510 from Asahi Glass Co., Ltd.; (5) tetrahydrofuran-propylene oxide copolymers are available under the trade name of PPTG1000, PPTG2000 and PPTG4000 from Hodogaya Chemical Co., Ltd.; (6) tetrahydrofuran-ethylene oxide copolymers are available under the trade name of Unisafe DC-1100 and Unisafe DC-1800 from NOF Corp.; (7) adducts of bisphenol A with ethylene oxide are available under the trade name of Uniol DA-400 and Uniol DA-700 from NOF Corp.; and (8) adducts of bisphenol A with propylene oxide are available under the trade name of Uniol DB-400 from NOF Corp.

Polyester Polyol

Suitable polyester polyols include adducts of diols compounds (e.g., ethylene glycol, propylene glycol, diethylene glycol, dipropylene glycol, 1,5-pentaglycol, 3-methyl-1,5-pentanediol, 1,6-hexanediol and neopentyl glycol) with ε-caprolactam or β-methyl-δ-valerolactone; reaction products of the foregoing diol compounds with dibasic acids such as succinic acid, adipic acid, phthalic acid, hexahydrophthalic acid and tetrahydrophthalic acid; and reaction products of three components, the foregoing diol compounds, the foregoing dibasic acids and ε-caprolactam or β-methyl-δ-valerolactone.

Polycarbonate Polyol

Suitable polycarbonate polyols include reaction products of diol compounds such as 1,6-hexanediol, 3-methyl-1,5-pentanediol, neopentyl glycol, 1,4-butanediol, 1,5-octanediol, 1,4-bis(hydroxymethyl)cyclohexane, 2-methylpropanediol, dipropylene glycol, dibutylene glycol, and bisphenol A or adducts of these diol compounds with 2 to 6 mol of ethylene oxide, with short chain dialkyl carbonates such as dimethyl carbonate and diethyl carbonate.

Also useful are polyester diols which are addition reaction products of these polycarbonate polyols with ethylene oxide, propylene oxide, ε-caprolactam or β-methyl-δ-valerolactone.

The polycarbonate polyols are commercially available, for example, in the trade name of Desmophen 2020E from Sumitomo Bayer Co., Ltd. and DN-980, DN-982 and DN-983 from Nippon Polyurethane Co., Ltd.

Alkyl Diol

Suitable alkyl diols include 1,6-hexanediol, 3-methyl-1,5-pentanediol, neopentyl glycol, 1,4-butanediol, 1,5-octanediol, 1,4-dihydroxycyclohexane, 1,4-bis(hydroxymethyl)cyclohexane, 2-methylpropanediol, tricyclodecane dimethanol, 1,4-bis(hydroxymethyl)benzene and bisphenol A.

Of these polyols, polyether polyols and alkyl diols are preferred because a resin composition having durability and a good balance of physical properties is obtainable.

(b) Alicyclic Polyisocyanate

Suitable alicyclic polyisocyanate components used herein include diisocyanates such as isophorone diisocyanate (i.e., 3-isocyanatomethyl-3,5,5-trimethylcyclohexyl isocyanate), hydrogenated 4,4'-diphenylmethane diisocyanate (i.e., 4,4'-methylenebis[cyclohexyl isocyanate]), hydrogenated xylylene diisocyanate (i.e., 1,3-bis(isocyanatomethyl)cyclohexane), 1,4-cyclohexane diisocyanate, 1,3-cyclohexane diisocyanate, 1,4-bis(isocyanatomethyl)cyclohexane, methyl-2,4-cyclohexane diisocyanate, methyl-2,6-cyclohexane diisocyanate, and norbornene diisocyanate (i.e., 1,3-cyclopentene diisocyanate); and polyisocyanates such as 1,3,5-triisocyanatocyclohexane, 1,3,5-trimethylisocyanatocyclohexane, 2-(3-isocyanatopropyl)-2,5-di(isocyanatomethyl)-bicyclo-[2,2,1]heptane, 2-(3-isocyanatopropyl)-2,6-di(isocyanatomethyl)-bicyclo[2,2,1]heptane, 3-(3-isocyanatopropyl)-2,5-di(isocyanatomethyl)-bicyclo[2,2,1]heptane, 5-(2-isocyanatoethyl)-2-isocyanatomethyl-3-(3-isocyanatopropyl)-bicyclo-[2,2,1]heptane, 6-(2-isocyanatoethyl)-2-isocyanatomethyl-3-(3-isocyanatopropyl)-bicyclo[2,2,1]heptane, 5-(2-isocyanatoethyl)-2-isocyanatomethyl-2-(3-isocyanatopropyl)-bicyclo-[2,2,1]heptane, and 6-(2-isocyanatoethyl)-2-isocyanatomethyl-2-(3-isocyanatopropyl)-bicyclo[2,2,1]heptane.

Of these, isophorone diisocyanate having two isocyanate groups of different reactivity within the molecule is especially preferred for use in the synthesis of the polyurethane (meth)acrylate oligomer according to the invention.

(c) Hydroxyl-Bearing (meth)acrylate

Suitable (meth)acrylates having hydroxyl groups used herein include hydroxyalkyl (meth)acrylates, for example, hydroxy($C_2$–$C_{10}$)alkyl (meth)acrylates such as 2-hydroxyethyl (meth)acrylate, 2-hydroxypropyl (meth) acrylate, 3-hydroxypropyl (meth)acrylate, 2-hydroxybutyl (meth)acrylate, 4-hydroxybutyl (meth)acrylate, pentanediol mono(meth)acrylate, hexanediol mono(meth)acrylate, and neopentyl glycol mono(meth)acrylate; 2-hydroxy-3-phenyloxy-propyl (meth)acrylate, 2-hydroxyalkyl (meth) acryloyl phosphate, 4-hydroxycyclohexyl (meth)acrylate, cyclohexane-1,4-dimethanol mono(meth)acrylate, trimethylol propane di(meth)acrylate, and pentaerythritol tri(meth) acrylate. Also included are products of addition reaction of glycidyl or epoxy group-bearing compounds such as alkyl glycidyl ethers, allyl glycidyl ethers and glycidyl (meth) acrylates with (meth)acrylic acid. These hydroxyl-bearing (meth)acrylates may be used alone or in admixture of any. Preferred hydroxyl-bearing (meth)acrylates are hydroxy ($C_2$–$C_4$)alkyl (meth)acrylates, especially 2-hydroxyethyl (meth)acrylate and 2-hydroxypropyl (meth)acrylate.

It is noted that polyurethane (meth)acrylate oligomers can be prepared by reacting the aforementioned components. The proportion of the respective components constituting the polyurethane (meth)acrylate oligomer is often such that hydroxyl groups in the polyol component constitute about 0.1 to 0.8 mol, preferably about 0.2 to 0.7 mol, and especially about 0.2 to 0.5 mol, and the hydroxyl-bearing (meth) acrylate constitutes about 0.2 to 0.9 mol, preferably 0.3 to 0.8 mol, and especially about 0.5 to 0.8 mol, per mol of isocyanate groups in the polyisocyanate.

It is not critical how to react the aforementioned components to form a polyurethane (meth)acrylate oligomer. In one embodiment, all the components are mixed together and reacted. In another embodiment, the polyisocyanate is reacted with either one of the polyol component and hydroxyl-bearing (meth)acrylate, after which the reaction product is reacted with the remaining component.

The urethane-forming reaction may be effected in the presence of a catalyst which is selected from organometallic urethane-forming catalysts such as stanous octoate, dibutyltin diacetate, dibutyltin dilaurate, cobalt naphthenate, and lead naphthenate, and amine catalysts such as triethylamine, triethylene diamine and diazabicyclo-undecene as well as other well-known urethane-forming catalysts.

The polyurethane (meth)acrylate oligomer (A) used herein should contain an oligomer having a number average molecular weight (Mn) of up to 1,000, preferably 400 to 1,000, and more preferably 400 to 800, in order to accomplish a good balance of physical properties including a high Young's modulus, a high elongation, and low temperature dependence of Young's modulus. The content of the low molecular weight oligomer should be 5 to 90% by weight and preferably 10 to 70% by weight of component (A).

The low molecular weight oligomer is synthesized from a low molecular weight polyol, preferably an alkyl diol, an alicyclic diisocyanate, and a hydroxyl-bearing (meth) acrylate as mentioned above, or from an alicyclic diisocyanate and a hydroxyl-bearing (meth)acrylate as mentioned above. Preferably it is an oligomer synthesized from 1 mol of an alicyclic diisocyanate and 2 mol of a low molecular weight hydroxyl-bearing (meth)acrylate.

It is noted that when a polyurethane (meth)acrylate oligomer is prepared using the above-mentioned components, the proportion and addition order of the respective components are adjusted so that an oligomer having a Mn of up to 1,000 may be produced in the above-defined content. Then the polyurethane (meth)acrylate oligomer containing a desired amount of a low molecular weight oligomer is obtainable.

(B) Ethylenically Unsaturated Compound

The ethylenically unsaturated compounds (B) used herein include, for example, N-vinyl compounds and compounds of the structure wherein amino or hydroxyl group-containing compounds are bonded with (meth)acrylic acid through amidation or esterification reaction. Useful are mono-, di- and poly-functional compounds as described below.

Monofunctional Compounds

Examples of the N-vinyl compounds include N-vinylacetamide compounds such as N-vinylpyrrolidone, N-vinylcaprolactam, N-vinylacetamide and N-vinylformamide. Examples of the compounds of the structure wherein (meth)acrylic acid is bonded with compounds having amino or hydroxyl groups through amidation or esterification reaction include methoxyethylene glycol (meth)acrylate, methoxypolyethylene glycol (meth)acrylate, nonylphenoxyethyl (meth)acrylate, nonylphenoxypolyethylene glycol (meth)acrylate, nonylphenoxypolypropylene glycol (meth)acrylate, 3-chloro-2-hydroxypropyl (meth) acrylate, phenoxyethyl (meth)acrylate, phenoxypolypropylene glycol (meth)acrylate, butoxypolyethylene glycol (meth)acrylate, alkyl (meth)acrylates, cyclohexyl (meth) acrylate, tetrahydrofurfuryl (meth)acrylate, isobornyl (meth) acrylate, benzyl (meth)acrylate, cumylphenol (meth) acrylate, cumylphenoxypolyethylene glycol (meth)acrylate, cumylphenoxypolypropylene glycol (meth)acrylate, 2-hydroxypropyl (meth)acrylate, 2-ethylhexyl (meth) acrylate, dicyclopentadiene (meth)acrylate, 2-hydroxy-3-phenoxypropyl (meth)acrylate, 2-(meth)acryloyloxyethyl-2-hydroxyethylphthalic acid, 3-acryloyloxyglycerin mono (meth)acrylate, 2-hydroxybutyl (meth)acrylate, 2-hydroxy-1-(meth)acryloxy-3-(meth)acryloxypropane, polypropylene glycol mono(meth)acrylate, polyethylene glycol mono (meth)acrylate, poly-ε-caprolactone mono(meth)acrylate, dialkylaminoethyl (meth)acrylates, glycidyl (meth)acrylate, mono[2-(meth)acryloyloxyethyl] acid phosphate, trichloroethyl (meth)acrylate, 2,2,3,3-tetrafluoropropyl (meth) acrylate, 2,2,3,4,4,4-hexafluorobutyl (meth)acrylate, perfluorooctylethyl (meth)acrylate, dicyclopentenyl (meth) acrylate, dicyclopentenyloxyalkyl (meth)acrylates, tricyclodecanyl (meth)acrylate, tricyclodecanyloxyethyl (meth)acrylate, isobornyloxyethyl (meth)acrylate, and morpholine (meth)acrylate.

Difunctional Compounds

Exemplary difunctional compounds include 2,2-dimethyl-3-hydroxypropyl-2,2-dimethyl-3-hydroxypropionate di(meth)acrylate, ethylene glycol di(meth)acrylate, tetraethylene glycol di(meth)acrylate, polyethylene glycol di(meth)acrylate, propylene glycol di(meth)acrylate, polypropylene glycol di(meth)acrylate, 1,4-butane diol di(meth)acrylate, 1,6-hexane diol di(meth) acrylate, glycol di(meth)acrylate, neopentyl glycerin di(meth)acrylate, hydroxypivalic acid neopentyl glycol di(meth)acrylate, di(meth)acrylate of ethylene oxide adduct of bisphenol A, di(meth)acrylate of propylene oxide adduct of bisphenol A, 2,2'-di(hydroxyethoxyphenyl)propane di(meth)acrylate, tricyclodecane dimethylol di(meth) acrylate, dicyclopentadiene di(meth)acrylate, pentane di(meth)acrylate, and di(meth)acrylic acid adduct of 2,2-bis (glycidyloxyphenyl)-propane.

Polyfunctional Compounds

Exemplary polyfunctional compounds include trimethylol propane tri(meth)acrylate, trimethylol propane trioxyethyl(meth)acrylate, pentaerythritol tri(meth)acrylate, pentaerythritol tetra(meth)acrylate, dipentaerythritol hexa(meth)acrylate, tetramethylol methane tri(meth)acrylate, tetramethylol methane tetra(meth)acrylate, tris(acryloxy) isocyanurate, tris(acryloxymethyl) isocyanurate, tris(acryloxyethyl) isocyanurate, tris(acryloxypropyl) isocyanurate, tris(2-hydroxy)isocyanurate, tri(meth)acrylate of tris(hydroxypropyl) isocyanurate, tri(meth)acrylate of isocyanurate, triallyltrimellitic acid, and triallyl isocyanurate.

Of these ethylenically unsaturated compounds, a monoethylenically unsaturated compound whose homopolymer has a glass transition temperature (Tg) of at least 50° C. is preferably used in order that the inventive composition have a low viscosity and a cured product thereof have a high Young's modulus, maintain the high Young's modulus even at elevated temperatures, and have a high elongation. When curing with electron beams and the properties (e.g., elongation, Young's modulus and temperature dependence of Young's modulus) of cured film are taken into account, at least one N-vinyl compound is preferably included. The N-vinyl compound is preferably selected from N-vinylpyrrolidone, N-vinylcaprolactam, N-vinylacetamide, N-vinylformamide and mixtures thereof.

The proportion of the polyurethane (meth)acrylate oligomer (A) and the ethylenically unsaturated compound (B) blended is selected depending on the type of the respective components (A) and (B), the desired viscosity of resin composition, and physical properties of cured products. Often the polyurethane (meth)acrylate oligomer (A) constitutes 20 to 90% by weight, preferably 40 to 80% by weight, and the ethylenically unsaturated compound (B) constitutes 80 to 10% by weight, preferably 60 to 20% by weight, based on the total weight of components (A) and (B). Further, the N-vinyl compound is preferably contained as component (B) in an amount of 3 to 20% by weight, more preferably 5 to 15% by weight.

If desired, a polymerization initiator may be added. Any well-known polymerization initiator is useful. Exemplary initiators include 1-hydroxy-cyclohexyl-phenyl-ketone, 2,2-dimethoxy-2-phenylacetophenone, phenylacetophenone diethyl ketal, alkoxyacetophenones, benzyl methyl ketal, benzophenone and benzophenone derivatives such as 3,3-dimethyl-4-methoxybenzophenone, 4,4-dimethoxybenzophenone and 4,4-diaminobenzophenone, alkyl benzoylbenzoates, bis(4-dialkylaminophenyl) ketones, benzyl and benzyl derivatives such as benzyl methyl ketal, benzoyl and benzoin derivatives such as benzoin butyl methyl ketal, benzoin isopropyl ether, 2-hydroxy-2-methylpropiophenone, thioxanthone derivatives such as 2,4-diethylthioxanthone and 2,4-dichlorothioxanthone, fluorene, 2-methyl-1-[4-(methyl-thio)phenyl]-2-morpholinopropane-1,2-benzyl-2-dimethylamino-1-(morpholinophenyl)-butanone-1, phosphine oxide derivatives such as 2,4,6-trimethylbenzoyl diphenyl phosphine oxide and bis(2,6-dimethoxybenzoyl)-2,4,4-trimethylpentyl phosphine oxide, organic peroxides such as benzoyl peroxide, t-butylperoxide and cumene hydroperoxide, and organic azo compounds such as azobiscyanovaleric acid, azobisisobutyronitrile, azobis(2,4-dimethyl)valeronitrile and azobis(2-aminopropane) hydrochloride.

The initiators may be used alone or in admixture of any. The amount of the initiator blended is not critical as long as the secondary coating composition satisfies the desired properties.

In addition to the above-mentioned components, the resin composition may further contain suitable additives, for example, antioxidants, stabilizers (e.g., UV absorbers), organic solvents, plasticizers, surfactants, silane coupling agents, coloring pigments, organic and inorganic particles as long as they does not compromise the objects of the invention.

The resin composition of the invention should desirably have a viscosity of about 1,000 to 10,000 mPa·s at 25° C. from the coating standpoint and more desirably in the range of about 1,000 to 4,000 mPa·s, especially under high-speed production conditions. As are conventional UV-curable compositions, the resin composition of the invention is cured upon exposure to electron beams. The thus cured film should preferably have a Young's modulus of 300 to 900 MPa, which range is desired for the film as the outer cover to protect the underlying optical fiber from external forces.

The coated optical fiber of the invention is manufactured by applying the above-mentioned resin composition to the primary coated optical fiber and curing it with electron beams accelerated at a low voltage of 50 to 125 kV so that the cured resin composition encloses the primary coating. The coated quartz optical fiber for communications which is now manufactured in a mass scale generally has the structure that a glass fiber in which a quartz core having a diameter of about 10 μm is covered with a quartz clad to a diameter of about 125 μm is enclosed with a primary coating to a diameter of about 200 μm and further enclosed with a secondary coating to a diameter of about 250 μm. In this fiber structure, if the accelerating voltage of electron beams for curing the secondary coating resin composition exceeds 125 kV, the electron beams can reach and damage the core, resulting in an increased transmission loss. If the accelerating voltage of electron beams is below 50 kV, the electron beams fail to reach the bottom of the secondary coating, leaving a lower portion of the secondary coating uncured. For this reason, the accelerating voltage of electron beams is set to 50 to 125 kV and preferably 60 to 100 kV. The dose of electron beams the secondary coating resin composition absorbs is usually in the range of about 10 to 100 kGy although it varies with the type of the resin composition.

In this way, a coated optical fiber with a minimized transmission loss is obtained.

EXAMPLE

Examples of the invention are given below by way of illustration and not by way of limitation. Mn is number average molecular weight and Tg is glass transition temperature.

Synthesis of Polyurethane Acrylate Oligomer (A)

Synthesis Example 1

In a nitrogen atmosphere, a liquid mixture of 18.6 g of isophorone diisocyanate, 385.5 g of polyoxypropylene ether glycol having an average molecular weight of about 3,300 (OH number=34 mg KOH/g), 149.5 g of polytetramethylene ether glycol having an average molecular weight of about 3,000 (OH number=37.5 mg KOH/g) and 0.5 g of dibutyltin dilaurate as a reaction catalyst was subjected to reaction at a temperature of 70 to 80° C. for 4 hours. It was confirmed by IR absorption spectroscopy that the absorption attributable to isocyanate group (NCO) ceased. Once the reaction mixture was cooled to 30° C., 471.2 g of isophorone diisocyanate was added thereto. Reaction was effected at a temperature of 60 to 70° C. for 2 hours. The reaction mixture was then cooled to 30° C., and the reactor interior was purged with dry air. With 0.44 g of 2,6-di-tert-butylhydroxytoluene added as a polymerization inhibitor, 472.4 g of 2-hydroxyethyl acrylate was added dropwise so that the reaction mixture was kept below 50° C. Next, 0.9 g of dibutyltin dilaurate as a reaction catalyst was added, the temperature gradually raised, and reaction effected for 6 hours at a temperature of 60 to 70° C. until the absorption peak attributable to isocyanate (NCO) group became undetectable by IR spectroscopy. In this way, a polyurethane acrylate oligomer A was obtained.

This oligomer A contained 59.5% by weight of a urethane acrylate oligomer having a molecular weight of 454 which was the reaction product of isophorone diisocyanate with 2-hydroxyethyl acrylate, as the oligomer with Mn of up to 1,000.

Synthesis Example 2

In a nitrogen atmosphere, a liquid mixture of 282.6 g of isophorone diisocyanate, 121.5 g of polytetramethylene ether glycol having an average molecular weight of about 2,000 (OH number=56.5 mg KOH/g) and 22.0 g of neopentyl glycol was subjected to reaction at a temperature of 70 to 80° C. for 4 hours. The reaction mixture was then cooled to 30° C., and the reactor interior was purged with dry air. With 0.24 g of 2,6-di-tert-butylhydroxytoluene as a polymerization inhibitor and 0.66 g of dibutyltin dilaurate as a reaction catalyst added, 232 g of 2-hydroxyethyl acrylate was added dropwise so that the reaction mixture was kept below 50° C. Next, the temperature was gradually raised, and reaction effected for 6 hours at a temperature of 60 to 70° C. until the absorption peak attributable to isocyanate (NCO) group became undetectable by IR spectroscopy. In this way, a polyurethane acrylate oligomer B was obtained.

This oligomer B contained 25.1% by weight of a urethane acrylate oligomer having a molecular weight of 780 which was the reaction product of neopentyl glycol, isophorone diisocyanate and 2-hydroxyethyl acrylate and 50.2% by weight of another urethane acrylate oligomer having a molecular weight of 454 which was the reaction product of isophorone diisocyanate with 2-hydroxyethyl acrylate, as the oligomer with Mn of up to 1,000.

Comparative Synthesis Example 1

The procedure of Synthesis Example 1 was repeated except that 18.6 g of isophorone diisocyanate used in the initial step was changed to 14.6 g of 2,4-toluene diisocyanate, and 471.2 g of isophorone diisocyanate used in the subsequent step was changed to 369.3 g of 2,4-toluene diisocyanate. In this way, a urethane acrylate oligomer C was synthesized.

Comparative Synthesis Example 2

The procedure of Synthesis Example 2 was repeated except that 282.6 g of isophorone diisocyanate was changed to 221.5 g of 2,4-toluene diisocyanate. In this way, a urethane acrylate oligomer D was synthesized.

Examples 1–2 and Comparative Examples 1–4

As shown in Table 1, electron beam-curable resin compositions of Examples 1–2 and Comparative Examples 1–4 were prepared by mixing the above-synthesized polyurethane acrylate oligomer with a compound having an ethylenically unsaturated group. Then the physical properties of these compositions were measured by the following methods. Separately, a quartz fiber was coated with a primary coating composition and then with the composition of Example 1, which was cured by means of an electron beam emitting equipment. The thus coated optical fiber was measured for transmission loss. The results are shown in Table 2.

Evaluation Methods:
(1) Preparation of Cured Film

The electron beam-curable resin composition was applied onto a glass plate to a thickness of 50 to 60 μm. The coating was cured by accelerating electron beams at a voltage of 30 to 100 kV and directing the electron beams to the coating in nitrogen so as to give a dose of 100 kGy. A cured film was obtained.

(2) Measurement of Young's Modulus

The cured film was conditioned for 24 hours at 25° C. and relative humidity 50% before 2.5% tensile modulus was measured under conditions: a gage mark distance of 25 mm and a pulling rate of 1 mm/min.

(3) Measurement of Tensile Strength and Elongation at Break

The cured film was conditioned for 24 hours at 25° C. and relative humidity 50% before tensile strength and elongation at break were measured under conditions: a gage mark distance of 25 mm and a pulling rate of 50 mm/min.

(4) Cure

Figure 2:
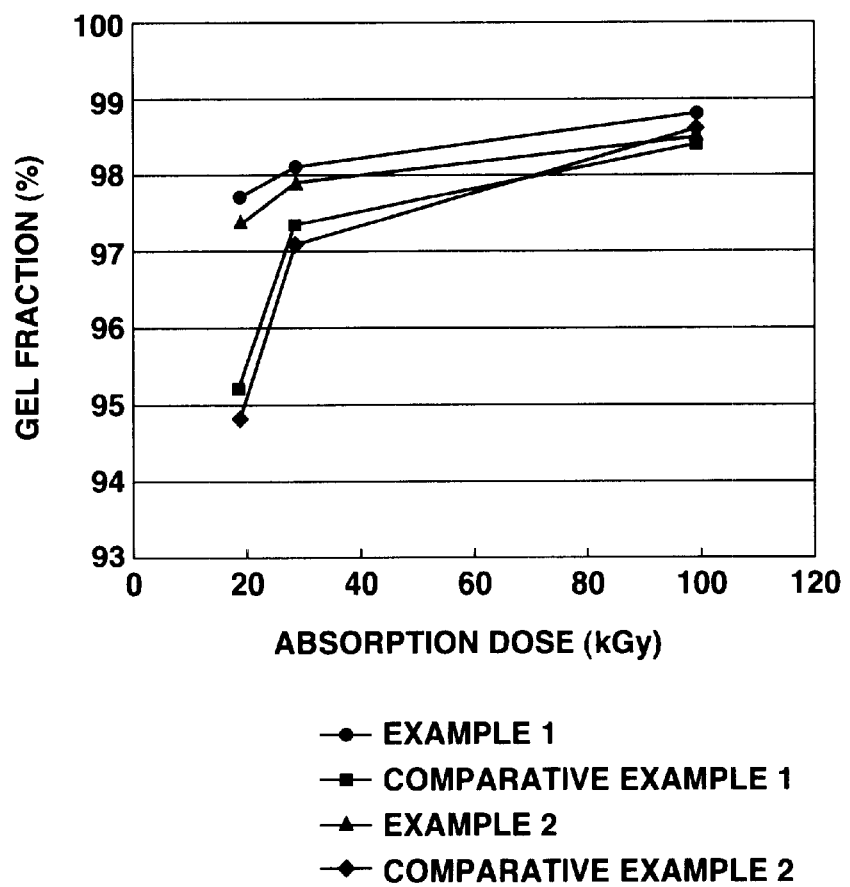
FIG. 2 is a graph of gel fraction versus absorption dose during EB curing of resin compositions of Examples and Comparative Examples.

The electron beam-curable resin composition was applied onto a glass plate to a thickness of 50 to 60 μm. The coatings were cured by accelerating electron beams at a voltage of 100 kV and directing the electron beams to the coating in nitrogen so as to give a dose of 20, 30 and 100 kGy. The cured films were measured for Young's modulus and gel fraction. The results are shown in FIGS. 1 and 2.

The gel fraction was determined by immersing the cured film in acetone for 16 hours for extraction, drying the film in vacuum at 70° C. for 2 hours, and calculating from the weights of the film before and after extraction.

(5) Measurement of Tg

The cured film was conditioned for 24 hours at 25° C. and relative humidity 50% before changes of tanδ with temperature were measured using an instrument of determining a viscoelastic behavior, Rheometrics Solids Analyzer RSAII (Rheometrics Scientific F. E.). The temperature giving the maximum change is Tg.

(6) Preparation of Coated Optical Fiber and Measurement of Transmission Loss

A quartz glass fiber as spun was coated with a primary coating composition (as formulated below) so as to give a diameter of 200 μm, which was cured in a UV irradiation equipment. The fiber was further coated with the resin composition of Example 1 (see Table 1) so as to give a diameter of 250 μm, which was cured by means of an electron beam emitting equipment such that electron beams accelerated at the indicated voltage were simultaneously irradiated to the coating from three directions in a dose of 100 kGy. In this way, a coated optical fiber of 3,000 m long was manufactured. Using OTDR, the coated optical fiber was measured for transmission loss with light having a wavelength of 1,550 nm. Primary Coating Composition A reactor was charged with 407.3 g of polypropylene glycol having a Mn of about 4,000 (Sanix PP4000, OH number=27.5 mg KOH/g, by Sanyo Chemical Industries, Ltd.) and 52.2 g of 2,4-tolylene diisocyanate, which were reacted in a nitrogen stream for 2 hours at 70 to 80° C. Thereafter, the reaction temperature was lowered to 50 to 60° C., and 0.6 g of dibutyltin dilaurate, 0.15 g of 2,6-di-tert-butylhydroxytoluene and 23.2 g of 2-hydroxyacrylate were added. Reaction was effected for 5 hours, yielding a polyether polyurethane acrylate oligomer having a Mn of about 8,900. The primary coating composition was obtained by mixing 60 parts by weight of this oligomer, 20 parts by weight of Aronix M-113 (Toagosei Co., Ltd.) 10 parts by weight of lauryl acrylate, 10 parts by weight of N-vinylcaprolactam and 3 parts by weight of Irgacure 1700 (Ciba Specialty Chemicals).

TABLE 1

| Component (pbw) | EB accelerating voltage (kV) | Example 1 | Example 2 | Comparative Example 1 | Comparative Example 2 | Comparative Example 3 | Comparative Example 4 |
|---|---|---|---|---|---|---|---|
| Polyurethane acrylate oligomer A | | 65 | | | | 65 | |
| Polyurethane acrylate oligomer B | | | 60 | | | | 60 |
| Polyurethane acrylate oligomer C | | | | 65 | | | |
| Polyurethane acrylate oligomer D | | | | | 60 | | |
| Isobornyl acrylate (Tg = 90–100° C.) | | 25 | 20 | 25 | 20 | 25 | 20 |
| N-vinylcaprolactam (Tg = 165° C.) | | 10 | 10 | 10 | 10 | 10 | 10 |
| Kayarad R-604 | | | 10 | | 10 | | 10 |
| Viscosity (mPa · s) | | 3,300 | 4,100 | 5,100 | 5,400 | | |
| Young's modulus (MPa) @25° C. | 30 | | | | | 492 | 531 |
| | 50 | 661 | 749 | 701 | 808 | | |
| | 100 | 704 | 793 | 767 | 875 | | |
| Elongation at break (%) @25° C. | 100 | 65 | 52 | 60 | 44 | | |
| Tensile strength (MPa) @25° C. | 100 | 3.9 | 3.8 | 4.0 | 3.7 | | |
| Tg (tanδ peak temperature, ° C.) | 100 | 112 | 114 | 118 | 119 | | |

Note: Kayarad R-604 is a difunctional acrylic compound by Nippon Kayaku Co., Ltd.

TABLE 2

Optical fiber transmission loss @ 1500 nm wavelength

| EB accelerating voltage | Transmission loss (dB/km) |
|---|---|
| 50 kV | 0.18 |
| 100 kV | 0.18 |
| 125 kV | 0.19 |
| 150 kV | 2.42 |

Japanese Patent Application No. 2001-035456 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coated optical fiber comprising a quartz glass fiber, a primary coating thereon and a secondary coating on the primary coating, said secondary coating being a cured product of a resin composition comprising (A) 20 to 90% by weight of a polyurethane (meth)acrylate oligomer which is synthesized using an alicyclic polyisocyanate as an essential starting reactant, contains 5 to 90% by weight of a polyurethane (meth)acrylate oligomer having a number average molecular weight of up to 1,000, and has an overall number average molecular weight of up to 10,000, and (B) 80 to 10% by weight of an ethylenically unsaturated compound, the resin composition being cured with electron beams accelerated at a voltage of 50 to 125 kV.

2. The coated optical fiber of claim 1 wherein the alicyclic polyisocyanate is isophorone diisocyanate.

3. The coated optical fiber of claim 1 wherein the ethylenically unsaturated compound comprises a monoethylenically unsaturated compound whose homopolymer has a glass transition temperature of at least 50° C.

4. The coated optical fiber of claim 3 wherein the ethylenically unsaturated compound comprises at least one N-vinyl compound.

5. The coated optical fiber of claim 4 wherein the N-vinyl compound is selected from N-vinylpyrrolidone, N-vinylcaprolactam, N-vinylformamide and mixtures thereof.

* * * * *